United States Patent [19]

Greene, Jr. et al.

[11] 4,328,981

[45] May 11, 1982

[54] DUCT STRUCTURE WITH REINFORCED END FLANGES

[76] Inventors: Carl B. Greene, Jr.; Carl B. Greene, III, both of P.O. Box 948, Chickasha, Okla. 73018

[21] Appl. No.: 188,232

[22] Filed: Sep. 19, 1980

[51] Int. Cl.³ .......................................... F16L 13/02
[52] U.S. Cl. .................................. 285/286; 285/405; 285/424; 138/160; 413/2
[58] Field of Search .............. 285/424, 363, 405, 286, 285/416; 138/109, 156, 177, 160, 163; 113/116 UT; 29/157 R; 228/149, 142

[56] References Cited

U.S. PATENT DOCUMENTS

| | | | |
|---|---|---|---|
| 682,026 | 9/1901 | Bungeroth | 285/368 X |
| 1,416,334 | 5/1922 | Connery | 285/424 X |
| 2,147,431 | 2/1939 | Ewing | 29/157 R |
| 3,782,763 | 1/1974 | Henrickson | 285/424 |
| 4,040,449 | 8/1977 | Butler | 285/424 |
| 4,215,518 | 8/1980 | Blair | 285/424 |

FOREIGN PATENT DOCUMENTS 663945  5/1979  U.S.S.R. .................. 285/363

*Primary Examiner*—Dave W. Arola
*Attorney, Agent, or Firm*—Harvey B. Jacobson

[57] ABSTRACT

A sheet metal duct section component including at least one pair of adjacent longitudinally extending integral panel portions relatively angulated about a longitudinal zone connecting adjacent longitudinal marginal portions of said panel portions. At least one pair of corresponding ends of the panel portions include individually bendable flanges extending endwise outwardly therefrom. The flanges are bent relative to and toward corresponding sides of the panel portions into generally coplanar relation and include outer end extremities bent backwardly over the flanges to define double thickness flanges. A filler plate of a thickness at least generally equal to the double thickness flanges and including an outside corner defined by adjacent relatively angulated marginal edges of the filler plate is provided and substantially conforms to the inside corner defined by the adjacent marginal portions of the double thickness flanges. The outside corner of the filler plate is positioned and secured, by welding, in the aforementioned inside corner with the filler plate substantially coplanar with the double thickness flanges. The double thickness flanges and the filler plate define a duct section end mounting flange assembly for end abutting of the duct section against and securement to a second transverse duct section wall, the double thickness flanges and the filler plate having mounting apertures formed therethrough.

6 Claims, 4 Drawing Figures

U.S. Patent     May 11, 1982     4,328,981
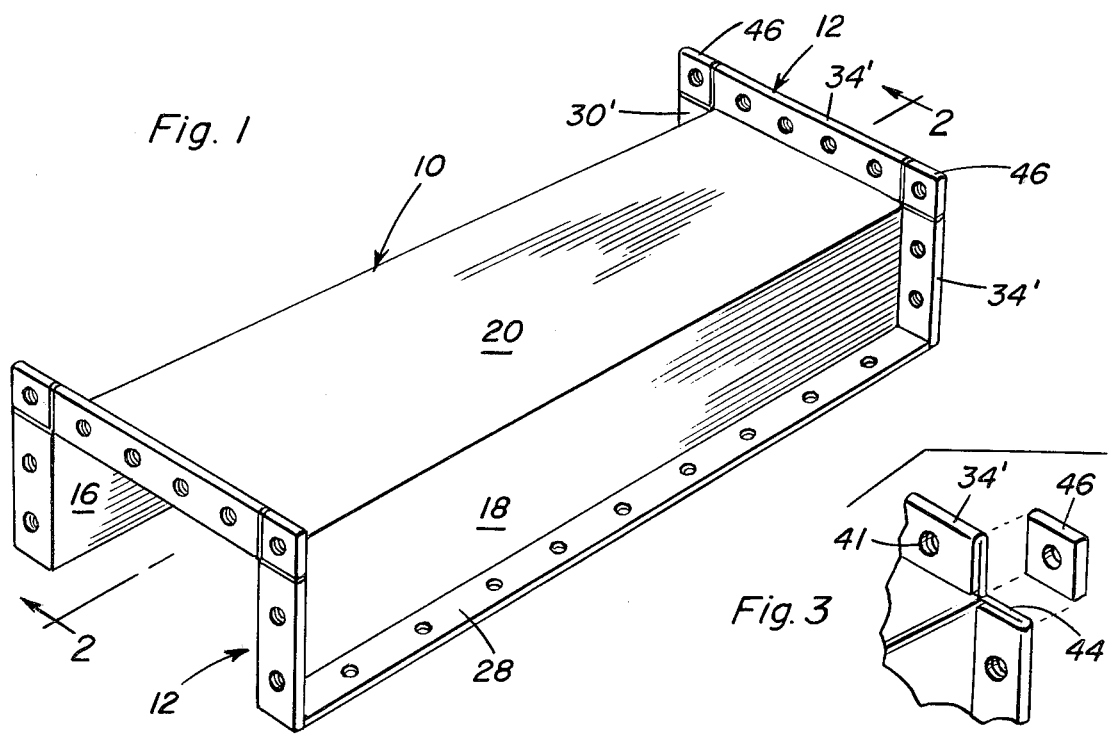
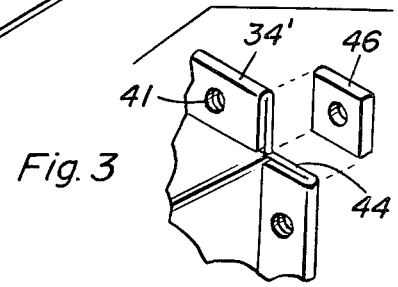
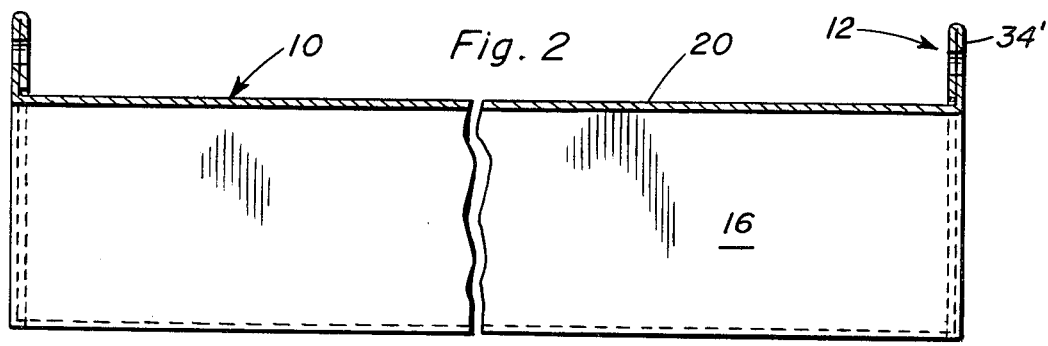
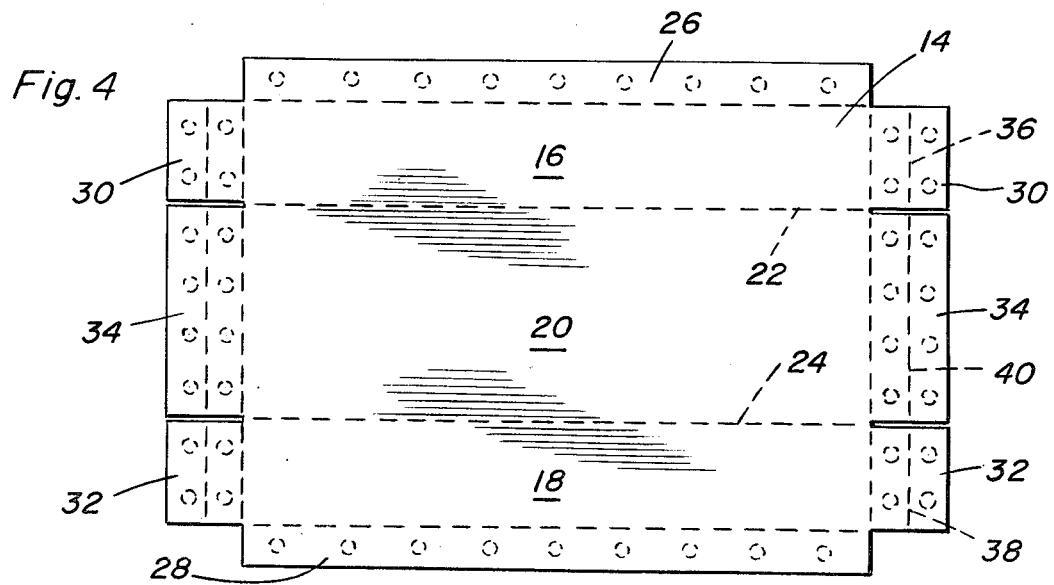

DUCT STRUCTURE WITH REINFORCED END FLANGES

BACKGROUND OF THE INVENTION

In various duct installations, the end of one duct section often abuts and is supported from a side wall of a second duct section with the first duct section communicating with the second duct section through an opening formed in the side wall thereof against which the first duct section abuts. Various structures are utilized at the end of the first duct section for securement of the latter to the side wall of the second duct section, and the most frequently utilized structure comprises a separate heavy gauge mounting flange defining frame member which is welded about the end of the first duct section and abutted against and secured to the side wall of the second duct section about the opening formed therein. While this type of mounting is acceptable, the process of welding the mounting flange defining frame to the end of the first duct section involves considerable welding and often results in the mounting flange defining frame being warped (due to the welding heat) with the result that the juncture between the first duct end and the side wall of the second duct section is not airtight.

Accordingly, a need exists for an improved form of interconnection between a first duct section opening endwise laterally into and through the side wall of a second duct section.

Examples of duct connecting structures and other similar joint structures including some general structural and operational features of the instant invention are disclosed in U.S. Pat. Nos. 1,049,543, 1,824,499, 1,833,043, 2,255,658, 3,451,243, 3,782,764 and 4,060,265.

BRIEF DESCRIPTION OF THE INVENTION

The duct connecting structure of the instant invention involves the formation of outturned double thickness mounting flanges on corresponding ends of side wall portions of a first duct section with double thickness filler plates secured by welding in the corner recesses defined between adjacent double thickness end flanges.

The double thickness flanges and filler plates are provided with suitable fastener receiving bores whereby the duct section end may be secured by suitable fasteners to a second duct section side wall having an opening formed therein and against which the end of the first duct section is abutted.

By forming integral double thickness flanges on corresponding ends of the side walls of the duct section and utilizing filler plates of approximately the same thickness for filling and to be welded in the inside corner recesses defined between adjacent double thickness flanges, an integral heavy thickness mounting flange defining frame is defined on the first duct section end independent of extensive welding on the duct section end, thereby reducing welding time and materials by more than 50% and substantially eliminating warpage (by welding heat) of the duct section end mounting flange assembly.

The main object of this invention is to provide structure whereby one end of a duct section component may be reinforced and abutted against and secured to one side wall of a second duct section about an opening formed therein.

Yet another object of this invention is to provide a duct section end mounting flange structure which may be quickly formed.

Still another important object of this invention is to provide a duct section end mounting flange assembly offering reinforcement at the duct section end for accomplishing the desired connection.

The final object of this invention to be specifically enumerated herein is to provide a duct section end mounting flange structure in accordance with the preceding objects and which will conform to conventional forms of manufacture, be of simple construction and easy to use so as to provide a device which will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a duct section including opposite end reinforced mounting flange structure in accordance with the present invention;

FIG. 2 is a fragmentary enlarged longitudinal vertical sectional view taken substantially upon the plane indicated by the section line 2—2 of FIG. 1;

FIG. 3 is an exploded perspective view of one corner portion of the reinforced duct section end mounting flange structure; and FIG. 4 is a plan view of a sheet metal blank from which the duct section illustrated in FIG. 1 may be formed.

DETAILED DESCRIPTION OF THE INVENTION

Referring now more specifically to the drawings, the numeral 10 generally designates a duct section including opposite end reinforced mounting flange structure in accordance with the present invention.

The reinforced mounting flange structures at the opposite ends of the duct section 10 are referred to in general by the reference numeral 12 and the numeral 14 designates a sheet metal blank from which the duct section 10 of FIG. 1 may be constructed.

The blank 14 defines three side-by-side longitudinally extending panel portions 16, 18 and 20, the panel portions 16 and 18 defining opposite side panel portions and the panel portion 20 defining a center panel portion disposed between the panel portions 16 and 18. A fold zone 22 is defined between the panel portions 16 and 20 and a fold zone 24 is defined between the panel portions 18 and 20. The panel portions 16 and 18 include laterally outwardly projecting longitudinal marginal flanges 26 and 28 extending along remote marginal portions of the panel portions 16 and 18 and the opposite ends of the panel portions 16, 18 and 20 includes endwise outwardly projecting end flanges 30, 32 and 34. The opposite end flanges 30, 32 and 34 are first bent backward upon themselves along fold lines 36, 38 and 40 to define double thickness flanges 30', 32' and 34'. The double thickness flanges 30', 32', 34' may be first formed and thereafter simultaneously bent to positions disposed at generally right angles relative to the panel portions 16, 18 and 20 with the blank 14 thereafter bent along the fold zones 22 and 24.

However, after the double thickness flanges 30', 32' and 34' have been formed and before the double thickness flanges have been bent to positions disposed generally 90° relative to the panel portions 16, 18 and 20, fastener receiving bores 41 are formed through the double thickness flanges. In addition, at the same time the double thickness flanges are bored, the opposite side longitudinal flanges 26 and 28 may be bored and at the time the double thickness flanges are bent to positions disposed generally at right angles relative to the panels 16, 18 and 20, the single thickness side flanges 26 and 28 may also be bent to positions disposed at generally right angles relative to the panel portions 16 and 18. Although not necessary, if it is desired, the flanges 26 and 28 may be extended outwardly and also folded back upon themselves in order to form double thickness flanges.

After the double thickness flanges 30', 32' and 34' have been formed and the panel portions 16, 18 and 20 have been bent relative to each other along the fold zones 22, 24 to form the generally channel-shaped duct section 10, inside corner recesses 44 are defined between adjacent ends of adjacent double flanges (see FIG. 3) and centrally apertured filler plates 46 of a thickness substantially equal to the double thickness flanges 30', 32' and 34' and defining outside corner portions are seated within the inside corner defining recess 44 and secured therein by welding. Thus, the filler plates 46 are welded into position in coplanar relation with the double thickness flanges 30', 32' and 34' by welding only along two adjacent marginal edges of each filler plate 46. In addition, the ends of the double thickness flanges 30' and 32' may be welded to the adjacent ends of the single thickness longitudinal side flanges 26 and 28, if desired. Also, opposite ends of the duct section 10 may be similarly formed. It is, of course, to be understood that the duct section 10 comprises a half duct section and that a pair of half duct sections may be joined together along corresponding longitudinal side flange portions 26 and 28 in order to form a complete duct section. However, such a complete duct section will include a heavily reinforced mounting flange at each end thereof extending completely thereabout.

By forming the mounting flange assembly defined by the double thickness flanges 30', 32' and 34' and the filler plates 46, the usual preformed U-shaped frame member welded to the end of the duct section 10 along the entire extent of the traverse end edges of the panel sections 16, 18 and 20 is eliminated and the total welding need to provide the mounting flange assembly of the instant invention comprises less than 50% of the welding which must be carried out if a U-shaped frame member is utilized.

It is, of course, to be noted that the double thickness flanges 30', 32' and 34' will in substantially all cases be disposed substantially coplanar with the filler plates 46. Further, the necessary right angle double thickness flanges 30', 32' and 34' may be formed through the utilization of conventional sheet metal forming presses and brakes and the filler plates 46 may or may not be predrilled.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A sheet metal duct section component including at least one pair of adjacent longitudinally extending integral panel portions relatively angulated about a longitudinal zone connecting adjacent longitudinal marginal portions of said panel portion, at least one pair of corresponding ends of said panel portions including individually bendable flanges extending endwise outwardly therefrom, said flanges being bent relative to and toward corresponding sides of said panel portions into generally coplanar relation and including outer end extremities bent backwardly over said flanges to define double thickness flanges, a filler plate of a thickness over its entirety at least generally equal to said double thickness flanges and including an outside corner defined by adjacent relatively angulated marginal edges of said filler plate substantially comforming to the inside corner formed by adjacent marginal portions of said double thickness flanges, said outside corner of said filler plate being positioned and secured, by welding, in said inside corner with said filler plate substantially coplanar with said double thickness flanges, said double thickness flanges and said filler plate defining a duct section end mounting flange assembly for end abutting of said duct section against and securement of said mounting flange assembly to a second duct section wall.

2. The duct section component of claim 1 wherein said double thickness flanges and said filler plate including fastener receiving bores formed therethrough.

3. The combination of claim 1 wherein said duct section comprises a U-shaped duct section including adjacent center and opposite side panel portions with each panel portion including a corresponding double thickness flange and a pair of said filler plates positioned and secured in the two inside corners defined between adjacent double thickness flanges on at least one end of said duct section.

4. The combination of claim 3 wherein the other end of said duct section also includes angulated, coplanar double thickness flanges and filler plates positioned and secured in the two inside corners defined between the adjacent other end double thickness flanges.

5. The combination of claim 3 wherein said U-shaped duct section includes a pair of at least single thickness and angulated flanges extending therealong and formed integrally with the remote longitudinal marginal edges of the side panel portions of said duct section.

6. The combination of claim 5 wherein securing means secures the opposite longitudinal ends of said single thickness flanges to the adjacent portions of the double thickness flanges carried by said side panel portions.

* * * * *